United States Patent [19]

Rose et al.

[11] 4,196,908
[45] Apr. 8, 1980

[54] SEAL FOR CENTRIFUGAL IMPACK ROCK CRUSHER

[75] Inventors: Neil M. Rose, Vancouver, Wash.; Stephen B. Ackers, Portland, Oreg.

[73] Assignee: Canica Crushers, Ltd., Vancouver, Wash.

[21] Appl. No.: 969,543

[22] Filed: Dec. 14, 1978

[51] Int. Cl.$^2$ ............ F16J 15/40; B02C 23/00
[52] U.S. Cl. ................... 277/12; 277/14 V; 277/72 FM; 277/135
[58] Field of Search ............ 277/12, 13, 14 R, 14 V, 277/17-21, 53, 54, 59, 71, 72 R, 72 FM, 79, 135; 241/275

[56] References Cited

U.S. PATENT DOCUMENTS

| | | | |
|---|---|---|---|
| 1,272,171 | 7/1918 | Zinssmeister | 277/135 X |
| 2,488,200 | 11/1949 | Juhlin et al. | 277/135 X |
| 3,174,698 | 3/1965 | Miller | 241/275 |
| 3,342,427 | 9/1967 | Moore et al. | 277/135 X |
| 3,358,939 | 12/1967 | Jasparac et al. | 241/275 X |
| 3,398,964 | 8/1968 | Trefil | 277/21 |
| 3,955,767 | 5/1976 | Hise | 241/275 |
| 4,103,903 | 8/1978 | Capriotti et al. | 277/14 V X |

FOREIGN PATENT DOCUMENTS

| | | | |
|---|---|---|---|
| 2231344 | 3/1973 | Fed. Rep. of Germany | 277/14 V |
| 533384 | 2/1941 | United Kingdom | 277/135 |
| 570653 | 7/1945 | United Kingdom | 277/13 |
| 691414 | 5/1953 | United Kingdom | 277/135 |

*Primary Examiner*—Robert S. Ward, Jr.
*Attorney, Agent, or Firm*—Chernoff & Vilhauer

[57] ABSTRACT

A seal located between the upper end of the pedestal and the drive shaft which is journaled therein on a rotary centrifugal impact rock crusher is comprised of a seal holder which is arranged for being press fit into the top of the pedestal. The holder has a central cylindrical bore, with a diameter which is greater than the drive shaft, through which the drive shaft extends. Accordingly, an oil seal snugly fills the gap between the housing and the drive shaft to prevent foreign material from contaminating the oil which is circulated through the pedestal for lubrication of the bearings in which the drive shaft is journaled. A grease passageway extends through the pedestal and holder so that grease can be injected into a cavity formed above the oil seal to protect the oil seal and to prevent it from becoming contaminated by foreign material such as crushed rock. A felt gasket partially fills the cavity to absorb and stabilize the grease, thereby increasing the time required between subsequent injections of fresh grease, and an annular sleeve, which defines the radial outward extent of the cavity, extends upwardly from the holder into a mating groove located in the hub which is attached to the upper extremity of the drive shaft.

8 Claims, 3 Drawing Figures

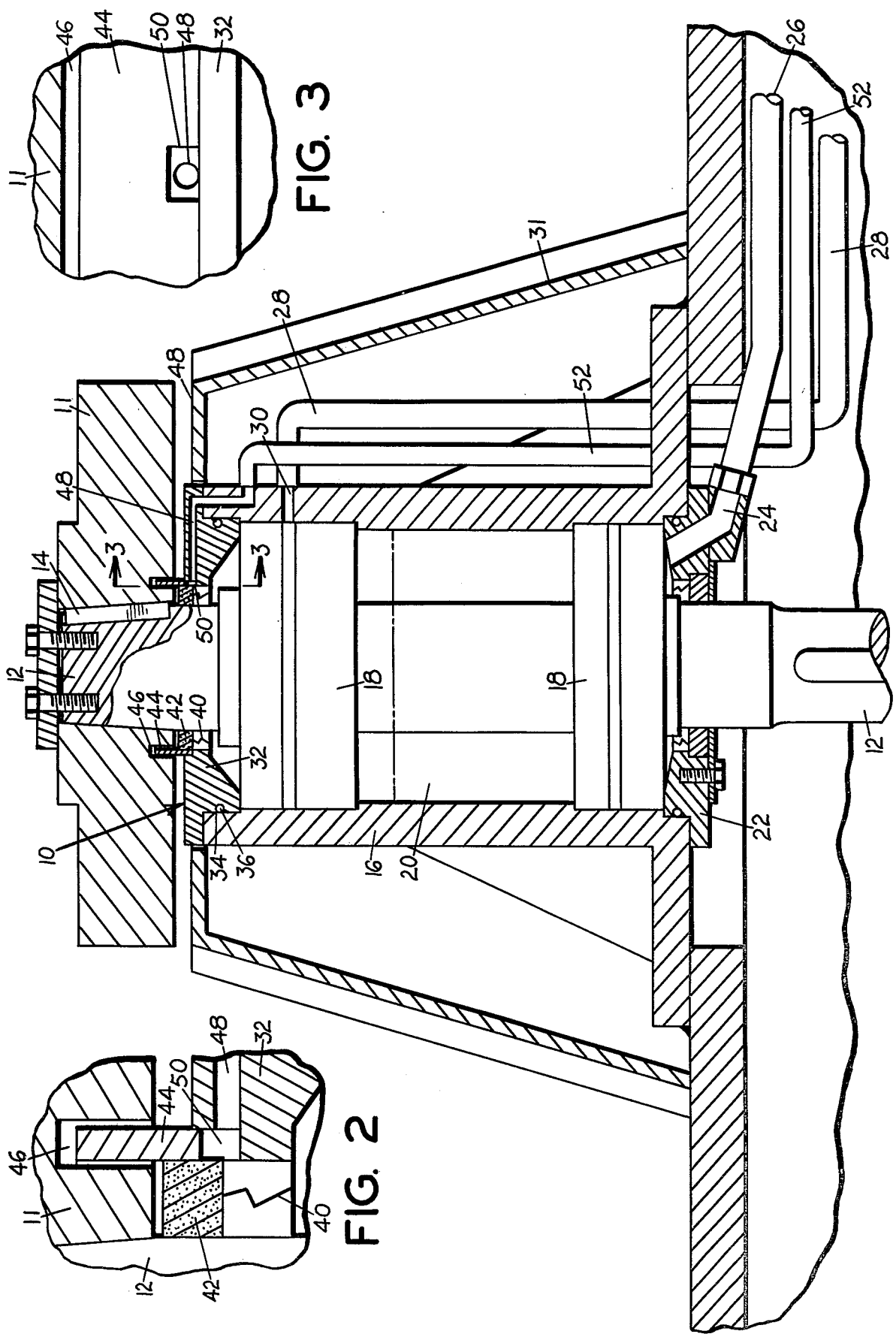

SEAL FOR CENTRIFUGAL IMPACK ROCK CRUSHER

BACKGROUND OF THE INVENTION

Centrifugal impact rock crushers of the prior art typically have a vertical drive shaft and a horizontal and impeller table on which are mounted several impeller shoes for throwing the material to be crushed off of the table against peripheral anvils where it is crushed upon impact. Since the impeller components are themselves massive and in addition carry a large load of heavy rock, the drive shaft must be journaled in bearings which are continuously lubricated in order to provide a long-lived crusher. These bearings normally are mounted in a pedestal which surrounds the drive shaft and which provides a reservoir for the oil that is circulated through the bearings.

While oil seals are provided at the top and bottom of the pedestal, to seal the drive shaft against leakage of oil and to prevent foreign matter from contaminating the oil, the top oil seal in particular is quite susceptible to wear and damage. The internal environment of crushers of this type includes large amounts of ground rock and rock dust which is very abrasive and yet is small enough so that it is difficult too mechanically screen from the operative portions of the crusher. Therefore, as the ground rock accumulates around and on top of the pedestal it tends to invade the upper oil seal thereby causing excessive wear and premature seal failure. Because of this condition, the oil seal must be constantly monitored for wear and it must be frequently replaced to prevent the rock from damaging the bearings when the oil seal does fail. As a result considerable labor expense and down time are expended to prevent this occurance. In addition, due to the high abrasiveness of the rock and the quanity of it which builds up adjacent to the seal, often the seal fails unexpectedly, thereby causing bearing failure even though extensive preventive action is undertaken.

SUMMARY OF THE INVENTION

The subject invention overcomes the above-mentioned disadvantages and limitations of the prior art centrifugal rock crusher upper drive shaft oil seals, by providing a means for injecting grease into a cavity located above the oil seal from outside of the crusher without the necessity of terminating crusher operation. The grease then provides an easily renewable buffer layer which prevents the crushed rock form reaching the seal.

The seal comprises a seal holder which is press fit into the open top of the pedestal and through which the drive shaft extends. The holder has a central cylindrical bore, having a larger diameter than the diameter of the drive shaft, through which the drive shaft extends, and an oil seal fits snugly into the space resulting between the holder and the drive shaft. In order to absorb the grease and prevent its rapid dissipation, an annular felt gasket is placed on top of the oil seal. The grease is introduced into the seal through a plurality of orifices located on the inner wall of the holder after being passed through a grease passageway which extends through the upper portion of the pedestal and the holder. A grease line, which extends from the grease passageway to outside the crusher, has a fitting for attachment of a grease gun at its extremity.

In order to further prevent dissipation of the grease, an annular sleeve is press fit into a notch located around the periphery of the central bore in the holder. The sleeve rotatably communicates within a mating annular notch which is located in the hub that interfaces the top of the drive shaft and the impeller table.

Accordingly, it is a principal objective of the present invention to provide a seal of the aforementioned class which is long lived in service.

It is a further object of the present invention to provide such a seal which eliminates the necessity of frequent termination of crusher operation for inspection and cleaning.

It is a further object of the present invention to provide such a seal which dos not require extensive redesign for installation in existing crushers, and which is inexpensive to fabricate.

The foregoing objectives, features and advantages of the present invention will be more readily understood upon consideration of the following detailed description of the invention taken in conjunction with the accompanying drawings.

BRIEF DESCRIPTION OF THE DRAWINGS

FIG. 1 is a fragmentary side elevational view, partially broken away to show hidden detail, showing a preferred embodiment of the seal of the present invention.

FIG. 2 is a fragmentary detailed view, at an enlarged scale, showing a portion of the seal.

FIG. 3 is a sectional view taken on the line 3—3 in FIG. 1.

DETAILED DESCRIPTION OF THE INVENTION

Referring to FIG. 1 of the drawings, the seal 10 of the subject invention is used on a centrifugal impact rock crusher of the type having a rotating cylindrical table (not shown) which is mounted to a hub 11, which in turn is fixed to a table drive shaft 12, such as by means of a key 14. The drive shaft is rotatably journaled in a tubular cylindrical pedestal 16 in upper and lower bearings 18 which are lubricated by a circulating oil system.

In the embodiment illustrated, the lower bearing 18 is submerged in oil 20 which is contained in the pedestal 16, and which is retained therein by a lower seal 22. Opening into the bottom of the pedestal and passing through seal 22 is an oil return channel 24 which is interconnected to the inlet of an oil pump (not shown) through an oil outlet line 26. The outlet of the oil pump is interconnected through an oil inflow line 28 to an oil inlet channel 30 which passes through the pedestal coincident with upper bearing 18. In the system illustrated, the oil 20 is not under pressure in the pedestal and is gravity urged through the line 26 to the pump.

The seal of the subject invention is located in the pedestal 16 above the upper bearing and serves both to prevent loss of oil out of the pedestal, and to prevent foreign materials from passing between the hub 11 and the shroud 31 which protects the pedestal and into the pedestal thereby contaminating the oil. The seal comprises a cylindrical seal holder 32 which has an outside diameter arranged for a press fit into the upper end of pedestal 16. Located in the outer wall of holder 32 is an outwardly facing rectangularly cross-sectioned O-ring groove 34 which carries an O-ring 36. The upper periphery of the holder extends radially outwardly to form an overhanging rim 38 which positions the holder in the pedestal.

Passing centrally through the holder is a cylindrical bore having a diameter which is greater than the diameter of the drive shaft 12, in order to accommodate a commercially available annular oil seal 40 snugly therebetween. Accordingly, the oil injected into the upper bearing 18 is retained in the pedestal and foreign material is prevented from entering the pedestal through its top. Located on top of the oil seal 40 is an absorbent felt annular gasket 42 which also fills the gap between the drive shaft 12 and the holder 32.

The upper inside corner of the holder 32 is notched and a tubular cylindrical sleeve 44 is press fit into the notch. Sleeve 44 is longer than the notch in the holder and, therefore, extends upwardly above the upper surface of the holder. Thus an annular groove 46 is located in the hub 11 to receive the extending portion of the sleeve 44.

In order to inject grease above the oil seal 40 and protect it from the abrasive crushed rock, a grease passageway 48, which passes through the upper portion of the pedestal and the holder, opens through a plurality of radially spaced orifices 50, FIGS. 2 and 3, in sleeve 44. In the embodiment illustrated, the orifices are positioned approximately intermediate oil seal 40 and gasket 42. A grease line 52 interconnectes passageway 48 and injection means such as a conventional zerk type grease fittings (not shown).

In operation, grease is injected into grease line 52 through passageway 48 in holder 32, and out of orifices 50 in sleeve 44. The grease then is absorbed into gasket 42 and flows around it to fill the gap between hub 11 and gasket 42, and the radially inwardly portion of groove 46. It will be noted that in addition to acting as a physical barrier for keeping foreign material away from seal 40, the sleeve 44 also serves to prevent the grease from being driven outwardly by centrifugal force when the drive shaft 12 is rotated.

The grease then acts as an additional seal to prevent the highly abrasive rock dust, which is being created in the crusher, from reaching oil seal 40 and causing it to prematurely wear out. As the grease becomes dissipated, more grease is added through line 52 to replace it and in the process wash any crushed rock or any other foreign matter away from oil seal 40. In addition to providing the necessary passageway for the grease, by extending grease line 52 outside of the shell of the crusher the grease can be introduced without the necessity of terminating crusher operations.

As a result, the life of the oil seal 40 is greatly increased and the likelihood of its being destroyed and admitting foreign material into the pedestal 20 where it will contaminate the oil and possibly destroy bearings 18 is greatly reduced.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A seal between the upper end of the pedestal and the drive shaft which is rotatably journaled within the pedestal, on a centrifugal impact rock crusher comprising:
   a. a seal holder arranged to be press fit in the pedestal at its upper extremity;
   b. said seal holder defining a central cylindrical bore which extends axially therethrough;
   c. oil seal means located within said bore for rotatably sealing the drive shaft against passage of material past the seal;
   d. grease located in said bore above said oil seal means to prevent foreign material from passing from outside of said pedestal, through said bore and reaching said oil seal means;
   e. said seal holder having a grease passageway extending from without said seal holder and opening into said bore above said oil seal means; and
   f. injection means associated with said grease passageway for injection of grease into said grease passageway.

2. The seal of claim 1 including an annular absorbent gasket, adapted to fill the gap between said seal holder and the drive shaft, located in said bore adjacently above said oil seal.

3. The seal of claim 2 wherein said grease passageway opens into said bore approximately intermediate said oil seal means and said absorbent gasket.

4. The seal of claim 1 wherein said grease passageway opens into said bore at a plurality of locations about the periphery thereof.

5. The seal of claim 2 including an upwardly extending annular sleeve mounted on said seal holder which encircles said absorbent gasket and extends thereabove.

6. The seal of claim 5 including a table mounting hub mounted to the upper extremity of said drive shaft, said hub defining an annular slot which is arranged to rotatably receive said sleeve.

7. A seal between the upper end of the pedestal and the drive shaft which is rotatably journaled within the pedestal, on a centrifugal impact rock crusher comprising:
   (a) a seal holder arranged to press fit in the pedestal at its upper extremity;
   (b) said seal holder defining a central cylindrical bore which extends axially therethrough;
   (c) oil seal means located within said bore for rotatably sealing the drive shaft against passage of foreign material past the seal holder into the pedestal;
   (d) said seal holder having a grease passageway extending from without said seal holder and opening into said bore above said oil seal means;
   (e) injection means associated with said grease passageway for injection of grease into said grease passage;
   (f) an annular absorbant gasket, adapted to fill the gap between said seal holder and the drive shaft, located in said bore adjacently above said oil seal; and
   (g) an upwardly extending annular sleeeve mounted on the said oil seal holder which encircles said absorbant gasket and extends thereabove.

8. The seal of claim 7 including a table mounting hub mounted to the upper extremity of said drive shaft, said hub defining an annular slot which is arranged to rotatably receive said sleeve.

* * * * *